Sept. 1, 1936. C. R. ALDEN 2,052,549
METERING PUMP
Filed Dec. 23, 1932 4 Sheets-Sheet 1
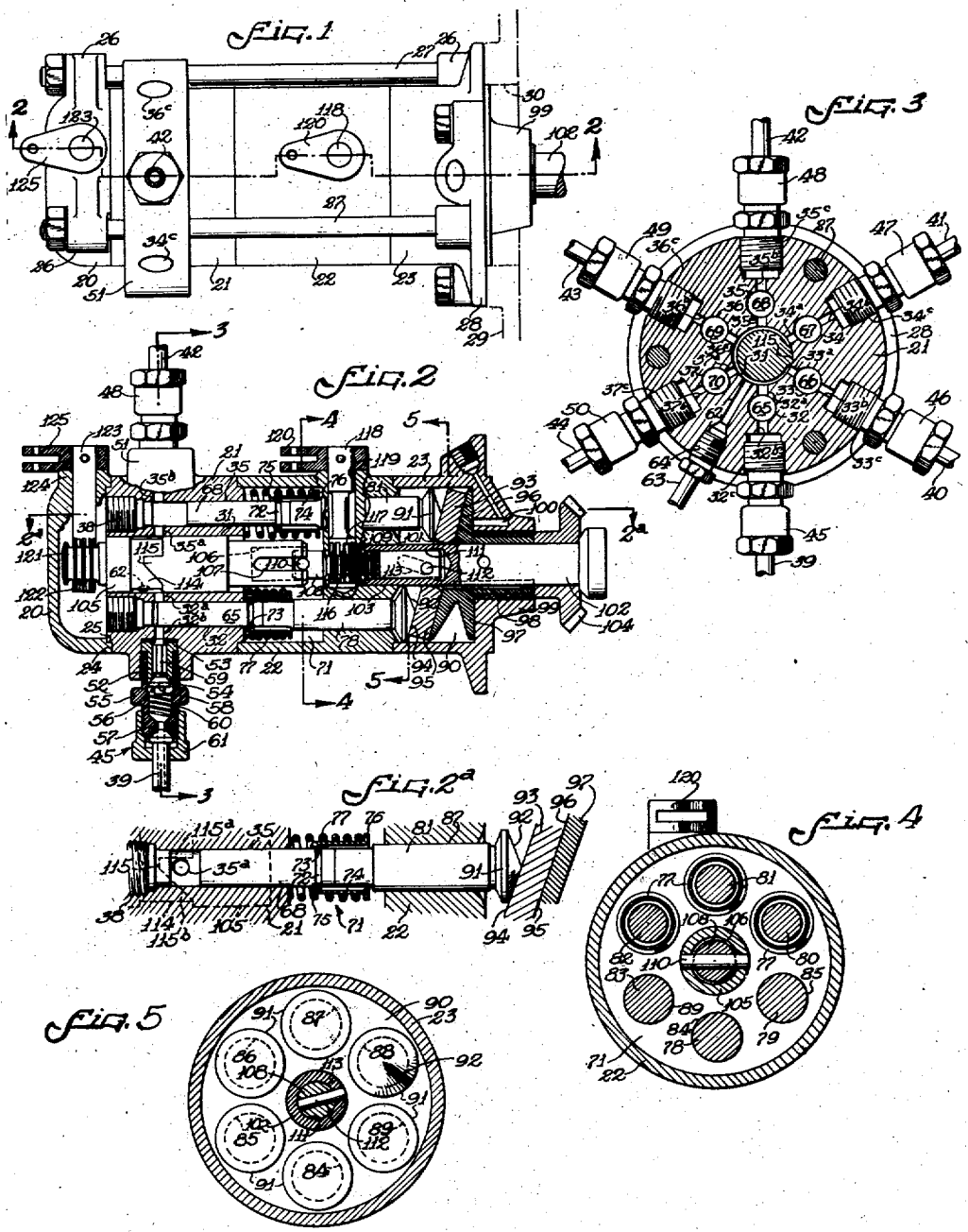
Inventor
Carl617 R. Alden
By Chindahl, Parker & Carlson
Attorneys Sept. 1, 1936.  C. R. ALDEN  2,052,549
METERING PUMP
Filed Dec. 23, 1932  4 Sheets-Sheet 2
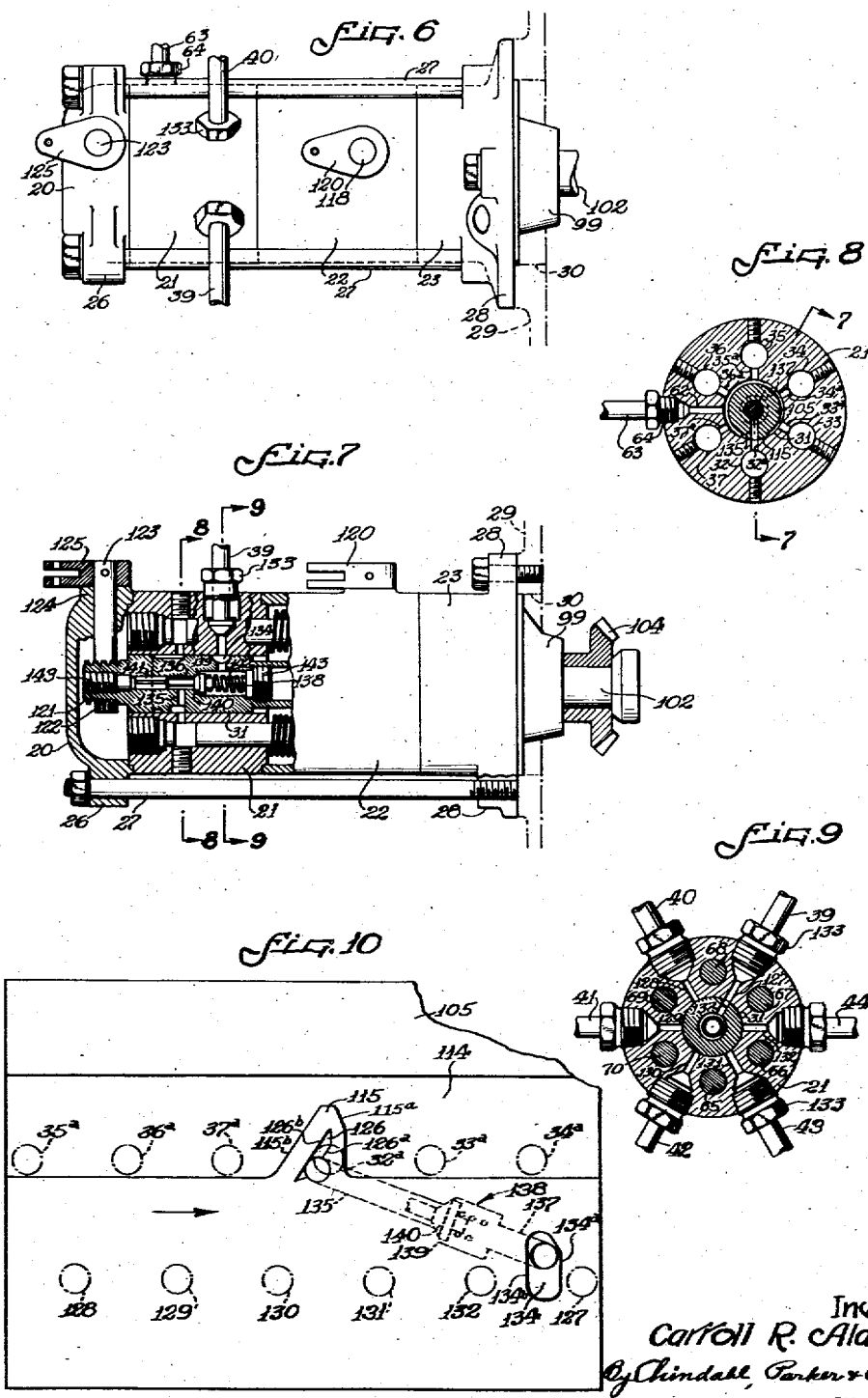

Sept. 1, 1936.   C. R. ALDEN   2,052,549
METERING PUMP
Filed Dec. 23, 1932   4 Sheets-Sheet 3
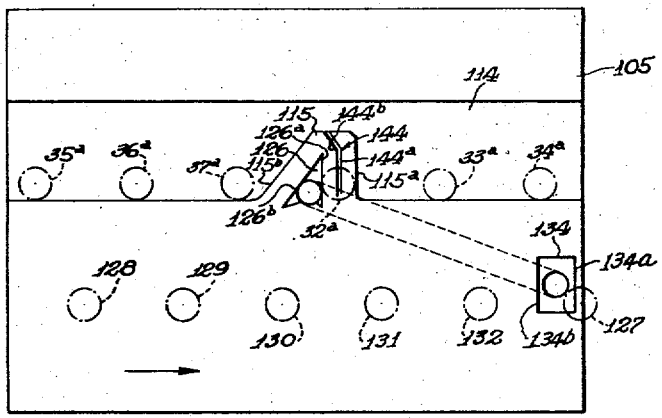
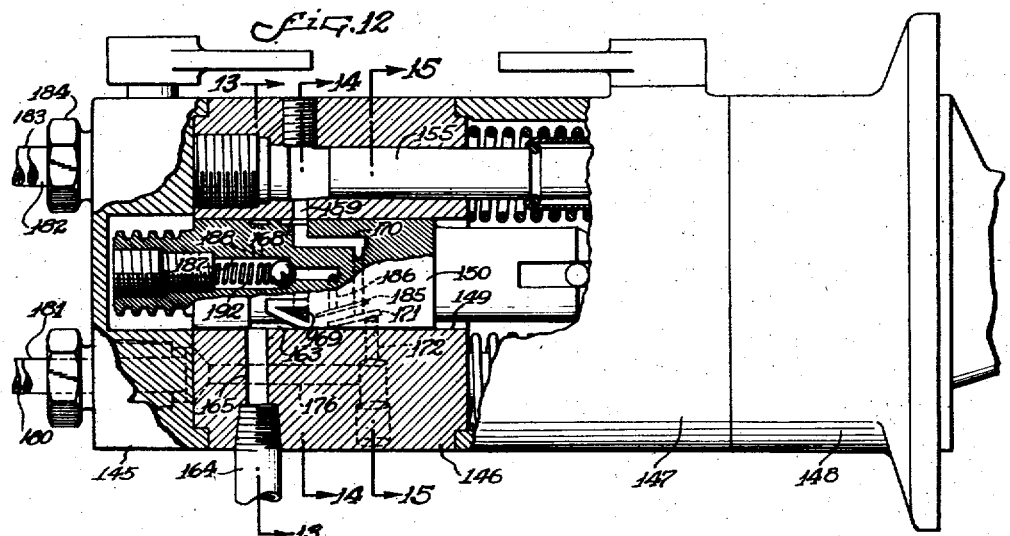
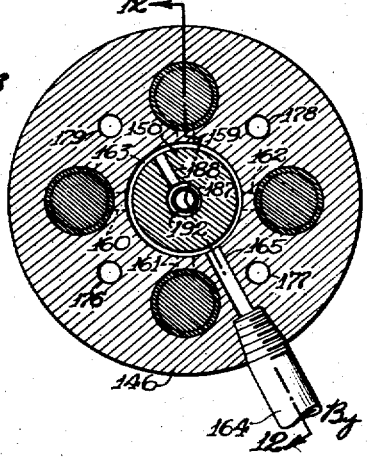
Inventor
Carroll R. Alden
By Chindahl, Parker & Carlson
Attorneys Sept. 1, 1936.   C. R. ALDEN   2,052,549
METERING PUMP
Filed Dec. 23, 1932    4 Sheets-Sheet 4
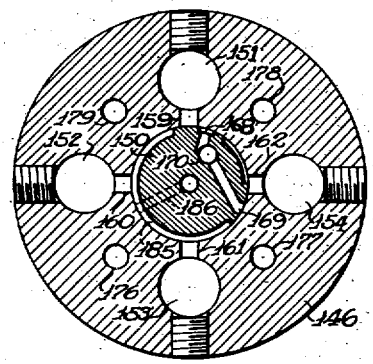
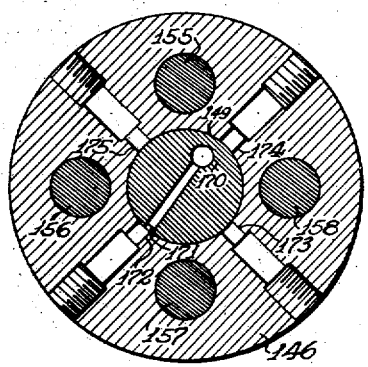
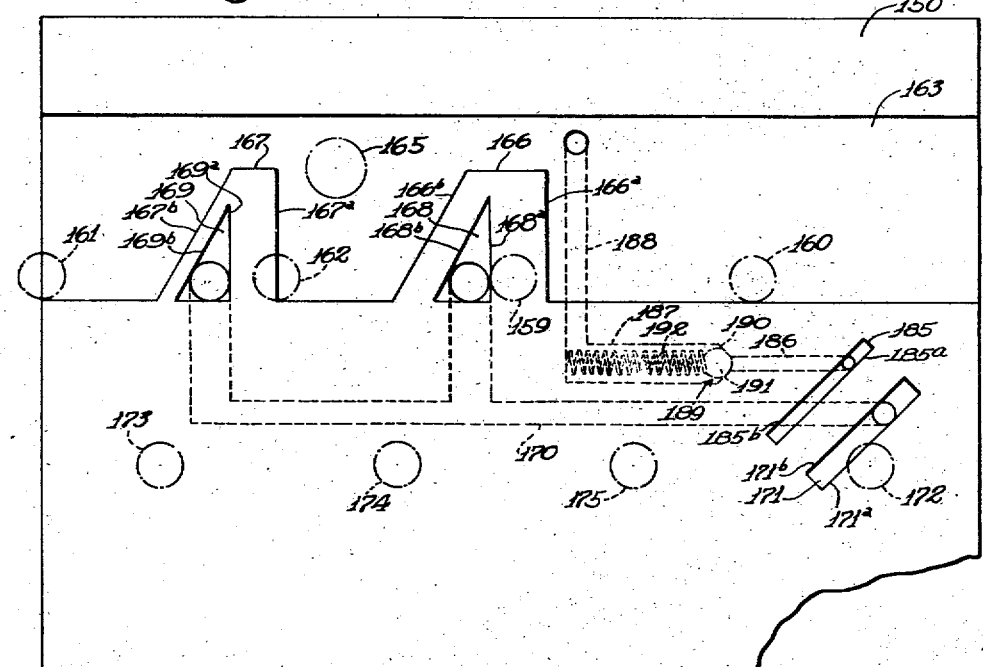

Patented Sept. 1, 1936

2,052,549

UNITED STATES PATENT OFFICE 2,052,549

METERING PUMP

Carroll R. Alden, Detroit, Mich., assignor to Ex-Cell-O Aircraft & Tool Corporation, Detroit, Mich., a corporation of Michigan Application December 23, 1932, Serial No. 648,606

49 Claims. (Cl. 123—139)

The present invention relates to improvements in metering pumps adapted particularly for supplying fuel under pressure to internal combustion engines.

One of the objects of the invention resides in the provision in a pump, having a plurality of cylinder and piston units with individual discharge lines, and having means for operating the units in timed sequence, of means including a novel rotary valve member for controlling the delivery of fluid from the cylinders in timed metered quantities to their respective discharge lines.

Further objects are to provide, in a pump of the foregoing character, a valve member which is adjustable to vary the duration and hence the volume of fluid delivery, and which preferably is also adjustable to vary the phase relation in each cylinder of the period of fluid delivery to the pressure period.

Still other objects of the invention reside in the provision, in a cylinder and piston pump, of a novel rotary valve member for delivering a metered quantity of fluid displaced from the cylinder over a predetermined intermediate period during each pressure stroke of the piston, the valve member being axially adjustable to vary the duration of the period of fluid delivery, and being angularly adjustable to vary the phase relation of the delivery period to the pressure stroke.

Another object is to provide a novel cylinder and piston pump, adapted to deliver a metered quantity of fluid during each pressure stroke of the piston, in which each fluid discharge is immediately preceded by the storage of trapped pressure energy in the cylinder and is initiated with a pressure wave or impulse resulting from the sudden release of the stored energy.

A further object is to provide a new and improved cylinder and piston pump, adapted to deliver a metered quantity of fluid over a predetermined period during each pressure stroke of the piston, in which the phase relation of the period of fluid delivery to the pressure stroke is subject to adjustment automatically in response to changes in the speed of operation.

Another object resides in the provision of a multiple cylinder and piston pump having a graduated rate of fluid delivery, and more particularly having a plurality of discharge lines one for each cylinder, and valve means for delivering metered quantities of fluid from the cylinders in timed sequence respectively to the discharge lines, a number of the cylinders being connected successively and in overlapping relation to each discharge line during the period of fluid delivery thereto.

A general object is to provide a novel pump which is simple and inexpensive in construction, and which with the aid of minor structural changes can be easily and advantageously adapted to accomplish a wide range of functions.

Further objects and advantages will become apparent as the description proceeds.

In the accompanying drawings, Figure 1 is a plan view of one form of pump embodying the features of my invention.

Fig. 2 is a longitudinal vertical sectional view taken substantially along line 2—2 of Fig. 1.

Fig. 3 is a transverse vertical sectional view taken substantially along line 3—3 of Fig. 2.

Fig. 4 is a transverse vertical sectional view taken substantially along line 4—4 of Fig. 2.

Fig. 5 is a transverse sectional view taken substantially along line 5—5 of Fig. 2.

Fig. 6 is a plan view of a modified form of the invention.

Fig. 7 is a fragmentary view partially in axial section substantially along line 7—7 of Fig. 8.

Fig. 8 is a transverse vertical sectional view taken substantially along line 8—8 of Fig. 7.

Fig. 9 is a transverse vertical sectional view taken substantially along line 9—9 of Fig. 7.

Fig. 10 is a diagrammatic view illustrating the rotor of the modified form in plan development with the associated ports superimposed in dotted outline.

Fig. 11 is a view similar to Fig. 10 of another modified form of the invention.

Fig. 12 is a fragmentary view partially in section along line 12—12 of Fig. 13 of still another modified form of the invention.

Figs. 13, 14 and 15 are transverse sectional views taken substantially along lines 13—13, 14—14 and 15—15 of Fig. 12.

Fig. 16 is a diagrammatic view illustrating the rotor of the form shown in Figs. 12 to 15 in plan development with the associated ports superimposed in dotted outline.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the pump in the form illustrated in Figs. 1 to 5 comprises an outer casing which is formed of a plurality of sections 20 to 23. Preferably, the sections are generally cylindrical in shape, and aligned in end abutting engagement. Each pair of adjacent sections are joined at their abutting ends by means of an annular flange 24 on one interfitting with a peripheral groove 25 in the other. The end sections 20 and 23 are formed externally with peripherally spaced lugs 26 aligned in pairs and connected by tie rods 27 to secure all of the sections in assembled relation. One of the end sections, namely the section 23, is adapted to be mounted on a suitable support, and to this end is provided with a peripheral mounting flange 28 herein shown as secured to a wall 29 about an opening 30. The wall 29 may constitute part of an engine crank shaft case where the pump is utilized as part of the fuel injection system.

More specifically, the two intermediate sections 21 and 22 constitute the pump body, the end section 20 constitutes a gear housing, and the other end section 23 constitutes a drive housing.

The body section 21 is formed with an axial bore 31 and with a plurality of longitudinal bores, six bores 32 to 37 in the present instance, constituting pump cylinders located in parallel uniformly spaced relation about the bore 31. The inner ends of the cylinders 32 to 37 are suitably closed by means of screw plugs 38 threaded into the adjacent end of the body section 21.

The inner ends of the cylinders 32 to 37 also are provided respectively with inlet ports 32ª to 37ª opening in a common transverse plane (see Fig. 3) to the periphery of the bore 31, and with outlet ports 32ᵇ to 37ᵇ in the same plane as the inlet ports and opening outwardly through the body section 21 for connection respectively to fluid discharge conduits 39 to 44. Preferably, the inlet and outlet ports for each cylinder are diametrically opposed and in radial alignment. Spring seated non-return valves 45 to 50 are interposed respectively between the outlet ports 32ᵇ to 37ᵇ and the discharge conduits 39 to 44.

To afford means for attaching the conduits 39 to 44 and the valves 45 to 50, the body section 21 is formed externally with a peripheral enlargement 51. The tie rods 27 extend through the enlargement 51 to increase the rigidity of the pump casing assembly. Opening radially inwardly from the periphery of the enlargement 51, and communicating axially respectively with the outer ends of the discharge ports 32ᵇ to 37ᵇ are a plurality of enlarged internally threaded bores 32ᶜ to 37ᶜ.

Preferably, the valves 45 to 50 are alike in construction, and hence the description of one will suffice for all. Thus, each valve comprises a sleeve 52 which is mounted concentrically in one of the bores 32ᶜ to 37ᶜ, and which has a peripheral flange 53 at its inner end and a conical valve seat 54 in its outer end. A valve casing 55 having a chamber 56 is threaded into the bore about the sleeve 52 and against the flange 53. The chamber 56 opens to the outer end of the casing 55 through a restricted port 57. A conical valve member 58, having a fluted stem 59 slidable in the sleeve 52, is movable in the chamber 56, and is normally held against the seat 54 by a coiled compression spring 60. The inlet end of one of the conduits 39 to 44 is connected by means of a gland nut 61 to the outer end of the casing 55 in communication with the port 57.

Opening through the body section 21 to the bore 31 in a plane closely adjacent that of the inlet ports 32ª to 37ª is an inlet passage 62. A supply conduit 63, adapted to be connected to a suitable source (not shown), is connected by means of a nut 64 to the enlarged outer end of the passage 62.

A plurality of pump pistons 65 to 70 are mounted for reciprocation respectively in the pump cylinders 32 to 37, and project therefrom into a chamber 71 formed in the adjacent end of the body section 22. Preferably, the pistons 65 to 70 are cylindrical in form throughout their length, and are urged outwardly by spring pressure. In the present instance, the outer end of each piston is formed with a peripheral groove 72, semi-circular in cross-section, in which a split wire ring 73 is snugly disposed. Mounted on each piston is an annular retainer 74 which has an inner peripheral flange 75 at one end fitting over the wire ring 73 snugly against the piston, and which has an outer peripheral flange 76 at the other end. The retainer 74 when in position prevents removal of the ring 73 from the groove 72. A coiled compression spring 77 is disposed in the chamber 71 and in spaced relation about each piston and its retainer 74, with its ends abutting respectively against the body portion 21 and the flange 76.

Respectively abutting against the outer ends of the pistons 65 to 70, within the spring retainers 74, and axially aligned therewith are a plurality of operating plungers 78 to 83. These plungers extend reciprocably through a plurality of parallel uniformly circularly spaced bores 84 to 89, formed in the body section 22 and in substantial axial alignment with the pump cylinders 32 to 37, into a chamber 90 in the housing section 23. It will be evident that the plungers 78 to 83 in effect constitute continuations of the pistons 65 to 70, but by reason of their separation from the pistons require less accuracy in construction than do the latter for efficient operation. To provide means for driving the pistons 65 to 70 in uniformly timed sequence and preferably harmonically, the outer ends of the plungers 78 to 83 in the chamber 90 are each provided with a head 91 having a conical bearing surface 92 adapted for engagement with a wobble member 93. Preferably, the wobble member 93 is in the form of an inclined circular disk which has a flat bearing surface 94 on one side against which the heads 91 are urged by the springs 77, and which has a parallel bearing surface 95 on the other side in free floating engagement with a flat inclined end surface 96 of a rotary drive disk 97. The drive disk 97 bears against the end wall of the housing section 23, and has an axial sleeve 98 rotatably journaled in a bearing 99 on the wall. Suitable ducts 100 are formed in the housing section 23 for supplying a lubricant to the bearing surfaces. Extending axially through the sleeve 98, the disk 97 and an opening 101 in the disk 93 into the chamber 90, and keyed to the sleeve for rotation therewith is a drive shaft 102. The surface of the opening 101 is curved so as to fit the shaft 102 in any angular position of the disk 93, thus locating the latter definitely in position on the drive disk 97. The inner end of the shaft 102 is rotatably supported in an axial bore 103 formed in the adjacent end of the body section 22. The outer end of the shaft 102 is adapted to be connected, as through a gear 104, to a source of power, such for example as the crank shaft of an internal combustion engine (not shown). It will be evident that as the shaft 102 is rotated the pistons 65 to 70 will be reciprocated harmonically in uniformly timed sequence.

A valve member 105 for controlling the passage of fluid through the inlet ports 32ª to 37ª is mounted in the central bore 31 for rotation in timed relation to the operation of the pistons 65 to 70. Preferably, the valve member 105 is in the form of a cylindrical rotor having a close fit in the bore 31. It will be evident that the pump body sections 21 and 22 constitute a valve casing for the rotor.

The valve rotor 105 may be driven by any suitable means, and is herein shown as connected to the drive shaft 102. Thus, one end of the valve 105 extends into the chamber 71, and is formed therein with an axial bore 106 and with two longitudinal diametrically opposed slots 107 opening to the bore. A connecting shaft 108, extending slidably and rotatably through a central bore 109 meeting the bore 103 in the body section 22, extends at one end into the bore 106 and carries a diametrical pin 110 slidably keyed at opposite ends in the slots 107. The other end of the shaft 108 extends into an axial bore 111 in the inner end of the drive shaft 102, and is keyed therein by means of a pin 112 extending in a longitudinally inclined or helical slot 113 formed in the side of the shaft 102.

The valve rotor 105 is formed with a peripheral groove 114 in constant communication with the inlet passage 62 and projecting through the plane of the inlet ports 32ª to 37ª. The groove 114 together with the surface of the bore 31 serves to define a low pressure fluid inlet area for supplying fluid to the pump cylinders 32 to 37. Projecting into one side of the area 114 through the plane of the inlet ports 32ª to 37ª, and adapted upon rotation of the rotor 105 to move successively across the ports is a raised land area 115 having a leading edge 115ª and a trailing edge 115ᵇ. The phase relation of the rotor 105 to the pistons 65 to 70 is such that the land area 115 will move across each inlet port and interrupt communication thereof with the fluid area 114 during a predetermined period of the pressure stroke of the associated pump piston. Preferably, this period is timed to occur at or near the middle of the pressure stroke when by reason of the simple harmonic drive the rate of flow is the greatest.

It will be evident that during the suction stroke of each piston, fluid from the fluid area 114 will pass freely through the associated inlet port into the pump cylinder, and that during the pressure stroke the fluid will be returned to the fluid area 114 excepting when the inlet port is closed by the land area 115, during which period the trapped fluid will be forced under pressure and in a metered quantity through the outlet port and the non-return valve to the discharge conduit, associated therewith.

By reason of the inclination of the slot 113, the phase relation of the rotor 105 to the operation of the pistons 65 to 70 may be varied by shifting the intermediate shaft 108 axially, thereby shifting the period of fluid delivery or injection relative to the degree of engine crank shaft rotation. Thus, the shaft 108 is formed with a longitudinal gear rack 116 which meshes with a pinion 117 on the inner end of a vertical shaft 118 journaled in a bore 119 formed in the body section 22. A lever 120 secured to the outer end of the shaft 118 is adapted to be connected to a suitable timing control means (not shown).

To provide means for adjusting the metered quantity of each fluid charge delivered by the pump, the land area 115 is tapered in width. Hence, axial adjustment of the rotor 105 will cause the duration of the period during which each inlet port is cut off or closed from the inlet fluid area 114 to be varied in accordance with the width of the land area 115. Within the broad concept of the invention, the width of the land area 115 may be varied in any manner, namely in either direction, uniformly or irregularly, symmetrically or unsymmetrically, etc. Preferably, however, the land area 115 tapers uniformly toward its free end, with the leading edge 115ª parallel to the axis of rotation and the trailing edge 115ᵇ inclined thereto, so that the start of discharge or injection is fixed and the cut-off thereof is variable. Reversing the rotation of the rotor 105 would result in a reversal of the leading and trailing edges of the land area 115.

To provide means for adjusting the rotor 105 axially, it is provided on one end with a longitudinal gear rack 121 which meshes with a pinion 122 in the housing section 20. The pinion 122 is fixed on the inner end of a vertical shaft 123 which extends from the section 20 through a bearing 124, and to the outer end of which a lever 125 is secured for connection to a suitable metering control means (not shown). The fluid area 114 is of such width that it will be capable of communication with the inlet passage 62 and the inlet ports 32ª to 37ª in all axial positions of the rotor 105.

Thus, the rotor 105 has both timing and metering functions, and more specifically is adjustable to vary independently the timed occurrence and the quantity or period of duration of each pump discharge. While the pump is not limited to any one purpose, it is particularly adapted, by reason of the foregoing functions, for use as a fuel metering pump in the injection system of an internal combustion engine. When the pump is so employed, the discharge conduits 39 to 44 may be connected respectively to the engine cylinders (not shown) or to the air intake manifold therefor (not shown), and may be provided at their discharge ends with suitable spring seated injection nozzle valves (not shown). Assuming for purposes of illustration that the pump is to be used to deliver fuel in timed metered sequential charges to the cylinders of an internal combustion engine, the duration of each pump discharge will be coincident with each period of fuel injection, and hence the two expressions are used synonymously herein.

The pump cylinders 32 to 37, instead of being connected to the discharge conduits 39 to 44 directly through the outlet ports 32ᵇ to 37ᵇ, may be connected thereto in timed sequence, during their respective pressure periods, by distributor means as embodied in the modified form of invention illustrated in Figs. 6 to 10. As a result, the individual check valves 45 to 50 need not be provided. The two forms of the invention are substantially alike in all other respects, and hence corresponding parts thereof will be identified by the same reference characters.

The distributor means preferably is embodied in the valve rotor 105, and utilizes the ports 32ª to 37ª, which serve as inlet ports when uncovered by the land area 115, as delivery ports. To this end, a recess in the form of an elongated slot 126 is formed within the land area 115 for movement successively across and hence into communication with the ports 32ª to 37ª upon rotation of the rotor 105. The recess 126 has a leading edge 126ᵃ and a trailing edge 126ᵇ, and extends generally longitudinally of the rotor 105. Since the land area 115 is timed to cover each of the ports 32ᵃ to 37ᵃ during a period of the pressure stage in the associated cylinder, the recess 126 will communicate with the port and receive therefrom a metered portion of the delivery of the associated pump plunger.

Opening to the bore 31 in a common transverse plane spaced from that of the combination inlet and delivery ports 32ᵃ to 37ᵃ are a plurality of uniformly peripherally spaced discharge ports 127 to 132. The inlet ends of the discharge conduits 39 to 44 are connected to the body section 21 in communication respectively with the discharge ports 127 to 132 by means of gland nuts 133. An elongated recess or slot 134 is formed in the periphery of the rotor 105 for movement successively across the ports 127 to 132, and is connected through a series of inter-communicating passages 135, 136 and 137 formed in the body of the rotor to the recess 126. The recess 134 has a leading edge 134ᵃ and a trailing edge 134ᵇ and extends generally longitudinally of the rotor 105. The recesses 126 and 134 are so related in angular phase to each other and to the respective sets of ports with which they are associated that during communication of the recess 126 with any one of the outlet ports 32ᵃ to 37ᵃ, the recess 134 is adapted to communicate for a given period with the associated one of the discharge ports 127 to 132, thereby connecting the associated pump cylinder and discharge conduit for the pressure injection of the fluid displaced by the associated plunger during said period.

It will be evident that upon moving either or both of the recesses 126 and 134 out of communication with the associated ports, communication of the discharge conduits 39 to 44 with the low pressure fluid area 114 will be interrupted at the surface of the bore 31, thus preventing any substantial return flow of the pressure fluid trapped therein. However, to insure the prevention of return flow under all operating conditions, a non-return valve 138 may be interposed between the recesses 126 and 134. In the present instance, the intermediate passage 136 extends axially through the rotor 105, and is formed between the passages 135 and 137 with an annular valve seat 139. A valve member 140 having a fluted stem 141 slidable in one end of the passage 136 is normally held against the seat 139 by a coiled compression spring 142. Suitable screw plugs 143 serve to close the opposite ends of the passage 136.

The specific form of the rotor 105, and more particularly the shape of and relationship between the land area 115, the recesses 126 and 134 and the associated ports, determine certain characteristics of the pump, and within the broad concepts of the invention are susceptible of numerous variations.

In the present form, the rotor 105 is of such character that axial adjustment thereof will effect a minutely graduated variation in the period of pressure injection from zero to maximum. Considering the set of related delivery and discharge ports for any one of the pump units, the periods of communication thereof respectively with the recesses 126 and 134 are not fully coincident, but on the contrary overlap. The degree of overlap determines the period of injection or pump discharge. To prevent the outlet port from by-passing fluid from the recess 126 to the low pressure fluid area 114, the width of the land area 115 between the trailing edges 115ᵇ and 126ᵇ is sufficient to cover the port completely. Preferably, the recess 126 is the first to break communication with its port so that the trailing edge 126ᵇ defines the point of cut-off. The recesses 126 and 134 are inclined to each other longitudinally of the rotor 105 so that axial adjustment will effect a proportional variation in the aforesaid degree of overlap and hence in the duration of the period of pump discharge. Preferably, the recess 134, and its longitudinal edges 134ᵃ and 134ᵇ, are parallel to the axis of rotation, and the recess 126 is inclined and the first to communicate with its port so that of the period of pump discharge, the starting point is fixed and the point of cut-off is variable for any given adjustment of the rotor in accordance with the inclination of the trailing edge 126ᵇ.

The land area 115 between the leading edge 115ᵃ and the recess 126 may have any suitable width, but if less than or only equal in width to the delivery port, the leading edge 115ᵃ must have passed from the port by the time the recess 134 is moved into communication with the related discharge port so as to prevent the by-passing of fluid from the discharge conduit to the low pressure fluid area 114. Thus, the leading edge 126ᵃ of the recess 126 merely determines the degree of initial opening prior to the start of the discharge period.

The rotor 105 is also of such character that each pump discharge or injection is started with a pressure wave or impulse due to stored pressure energy. In the preferred form, the stored pressure energy is created by cutting off the delivery port from each pump cylinder by the land area 115 a short time before the recess 134 is moved into communication with the related discharge port. It will be evident that during the remaining movement of the rotor before such communication, the pump cylinder will have no outlet, and hence the piston will compress the fluid therein to a point in excess of the normal discharge pressure.

The operation of the pump will be readily understood upon reference to Fig. 10. Assuming that the rotor is turning in the direction of the arrow and that the leading edge 115ᵃ of the land area 115 has just passed over the delivery port 32ᵃ, communication of the port with the recess 126 will have been established. However, connection of the pump cylinder 32 with the discharge conduit 39 will not yet have been completed since the recess 134 is still spaced from the discharge port 127. During the movement of the rotor through the remaining distance necessary to move the recess 134 into communication with the port 127, the fluid in the cylinder will be trapped and hence subject to being highly compressed by the pump piston 85. However, upon completing the discharge connection, the stored pressure energy will initiate the pump discharge or injection with a surge or impulse which will tend to open the check valve 138 and also any valve (not shown) in the discharge conduit 39 without delay and which will tend to take up the natural resiliency inherent in the walls of the conduit so as to insure prompt and accurately metered injection. The fluid displaced from the pump cylinder is discharged to the conduit 39 until the trailing edge 126ᵇ leaves the port 32ᵃ. Immediately thereafter, the port 32ᵃ is uncovered by the land 115 and again communicates with the low pressure fluid area 114 to which the fluid displaced by the remaining movement of the piston 65 in its pressure stroke is by-passed. The port 32ª continues in communication with the fluid area 114 during the subsequent suction stroke of the pump piston 65 and until during an intermediate portion of the next pressure stroke of the piston it is again covered by the land 115.

The foregoing operation is the same for all of the respective pump units. Hence the discharge conduits 39 to 44 are supplied in timed sequence with accurately metered fluid charges for injection or for any other purpose.

Another modified form closely similar to that of Figs. 5 to 10 is illustrated in Fig. 11. These two forms are alike structurally except for slight changes in the rotor 105, and differ in operating characteristics as a result of the differences in rotor structure. Hence, only a plan development of the rotor 105 is illustrated in Fig. 11, and corresponding parts of the two forms are designated by like reference characters.

In this second modified form of the invention, the rotor 105 is operable automatically to advance the timing of the pump discharge as the speed is increased. The recess 134 is located to communicate with each discharge port before cutoff of the related delivery port by the land 115. Hence, opening of the recess 126 to the delivery port determines the start of pump discharge. Preferably, the leading edge 126ª is parallel to the axis of rotation so that the point of communication with the delivery ports will be constant for all axial positions of the rotor 105. To prevent by-passing from the recess 126 to the fluid area 114, the width of the land area 115 between the leading edges 115ª and 126ª is just sufficient to cover each delivery port as it passes thereover.

Formed in the leading face of the land area 115 and preferably extending parallel to the leading edge 126ª is a narrow shallow by-pass slot 144 opening to the low pressure fluid area 114, and having leading and trailing edges 144ª and 144ᵇ.

In operation, assuming the rotor 105 to be turning in the direction of the arrow and the parts to be in the relative position shown in Fig. 11, the recess 134 is open to the discharge port 127, the delivery port 32ª is covered by the land area 115, and the recess 126 is about to open to the delivery port 32ª. At this time, the pump piston is moving approximately at its maximum velocity in its pressure stroke.

The port 32ª, although past the leading edge 115ª, is vented to the low pressure area 114 through the slot 144, and will continue to be so vented until it moves past the trailing edge 144ᵇ. At relatively slow speeds, the slot 144 while open to the port 32ª will by-pass substantially all of the fluid displacement of the pump piston 65 to the low pressure area 114. Hence, the discharge of fluid to the conduit 39 will be delayed until the port 32ª passes the trailing edge 144ᵇ of the slot 144. Thereafter, the full displacement of the pistons 65 will be delivered until cut-off by the trailing edge 126ᵇ. As the speed is increased, less fluid is by-passed through the slot 144 so that the timing of the start of fluid delivery is advanced. At relatively high pump speeds, the slot 144 is insufficient in capacity to by-pass any appreciable amount of the fluid displaced by the piston 65, and hence the start of fluid delivery will occur substantially when the recess 126 moves into communication with the port 32ª.

Still another form of the invention is illustrated in Figs. 12 to 16. In this form, each discharge conduit is adapted to receive fluid under pressure from a plurality of the pump cylinders. The cylinders may be connected in overlapping sequence so as to provide a graduated rate of fluid delivery to the conduit. The characteristics of the pressure fluid delivery may be substantially adjusted, and incidentally the capacity of the pump may be controlled by varying the timing of this sequence, the number of cylinders that will be connected, or the relative periods during which the cylinders are connected on occasion to each conduit. The graduated control of the rate of pump delivery is particularly desirable in certain types of Diesel engines in which the rate of pressure rise in the engine cylinders influences the operating characteristics of the engine.

Referring more particularly to Figs. 12 to 16, the pump comprises a series of generally cylindrical casing sections 145, 146, 147 and 148 assembled in end to end relation. The intermediate body section 146 is formed with an axial valve bore 149 in which a rotor 150 is slidably and rotatably disposed, and with a plurality of pump cylinders, four cylinders 151, 152, 153 and 154 in the present instance, located in parallel uniformly peripherally spaced relation about the bore and in which a plurality of pump pistons 155, 156, 157 and 158 are respectively disposed for reciprocation. The pistons 155 to 158 may be driven with harmonic motion in timed sequence, the phase relation of the rotor 150 to the pistons may be varied, and the axial position of the rotor may be adjusted by means of the same construction as in Figs. 1 to 5.

Opening respectively from the closed inner ends of the pump cylinders 151 to 154 to the bore 149 are a plurality of inlet and delivery ports 159, 160, 161 and 162. These ports are always within the range of a peripheral groove 163 formed in the rotor 150 and defining a low pressure fluid area. A fluid supply conduit 164 connected to the side of the body section 146 is in communication with the area 163 through a passage 165 in the section for all positions of the rotor 150.

A plurality of land areas, two areas 166 and 167 in the present illustration, project into one side of the fluid area 163 for movement across the delivery ports 159 to 162. Preferably, the land areas 166 and 167 are triangular in form, having respectively leading edges 166ª and 167ª parallel to the axis of rotation, and trailing edges 166ᵇ and 167ᵇ inclined to said axis. Formed respectively in the land areas 166 and 167 are two recesses or slots 168 and 169 extending generally longitudinally of the rotor. Preferably, the recesses 168 and 169 also are triangular in form, with straight leading edges 168ª and 169ª parallel to the edges 166ª and 167ª and with inclined trailing edges 168ᵇ and 169ᵇ parallel to the edges 166ᵇ and 167ᵇ. Hence, the point at which each recess will open to any one of the delivery ports will remain fixed while the point at which cut-off will occur will vary upon axial adjustment of the rotor 150.

The recesses 168 and 169 are connected in parallel to a branched delivery passage 170 formed within the rotor 150. Preferably, the recesses 168 and 169 are so spaced and the rotor 150 is so timed to the pump pistons that the leading recess 168 will open to each delivery port during the initial portion of the pressure stroke of the associated pump piston so as to deliver a primary fluid charge to the passage 170, and the trailing recess 169 will open to another or the next delivery port at a slightly later time so as to deliver a main or secondary fluid charge superimposed on the remainder of the primary charge. It will be evident that the two recesses 168 and 169 define a composite period of overlapping communication with two different and unequal pressure sources by reason of which a graduated rate of fluid delivery is made available. The duration of this period and the composite pressure characteristics thereof are subject to variation by adjusting the rotor 150 axially. At adjustment for minimum or small pump delivery, the recesses 168 and 169 may not communicate simultaneously with the respective delivery ports.

The leading faces of the lands 166 and 167 in advance of the recesses 168 and 169, and also the trailing face of the land 166 are of sufficient width to cover each delivery port so as to prevent the port from by-passing fluid thereacross to the low pressure area 163, and more particularly to prevent interruption of the fluid delivery period.

As in the modified form of Figs. 5 to 10, stored pressure energy is built up in each pump cylinder just before communication of the related delivery port with either of the recesses 168 and 169 so that fluid delivery will be initiated with a pressure impulse or wave. In the present instance, the leading face of each of the land areas 166 and 167 is greater in width than each of the delivery ports 159 to 162. Upon movement of the leading face of either land area across any one of the delivery ports, the related pump cylinder will be sealed during a predetermined degree of rotation of the rotor 150 during which the fluid in the cylinder will be compressed above the normal discharge pressure. The difference in width between each leading face and delivery port determines the degree of pressure storage.

The delivery passage 170 opens to an elongated delivery recess or slot 171 which is formed in the periphery of the rotor 150 and extends generally longitudinally thereof, and which is movable in all axial positions of the rotor into successive communication with a plurality of uniformly spaced discharge ports 172, 173, 174 and 175 formed in the body section 146 and opening to the bore 149. The ports 172 to 175 are connected respectively through passages 176, 177, 178 and 179 formed in the body section 146 to a plurality of discharge conduits 180, 181, 182 and 183 extending through and secured by screw plugs 184 in the end section 145.

The delivery recess 171 is timed to communicate with each of the discharge ports 172 to 175 during some portion of the related composite pressure period in the passage 170. The degree to which the opening of the recess 171 to each of the discharge ports overlaps the pressure period determines the duration of fluid discharge, and the phase relation of the overlap to the pressure period determines the pressure and rate of fluid discharge. So that these characteristics may be adjusted, the recess 171 is formed with parallel leading and trailing edges 171ᵃ 171ᵇ inclined to the axis of the rotation. It will be evident that upon adjustment for small loads, the trailing recess 169 may be cut out entirely from communication with the recess 171 and only the primary delivery of fluid through the recess 168 will occur.

Each discharge conduit immediately after being cut off at the rotor 150, is filled with trapped fluid, and, due to the natural resiliency of its walls, is stored with a substantial amount of pressure energy. In some instances, as for example in fuel injection systems where the discharge conduit has an outlet valve, it is desirable to reduce the stored pressure energy in the conduit quickly to a point below the closing pressure of the valve so as to prevent dribbling and produce a sharply defined cut-off of injection. To this end, a narrow inclined bleed slot 185 is cut in the periphery of the rotor 150. The slot 185 is parallel to and trails the recess 170, and is so spaced therefrom that each of the discharge ports 172 to 175 upon leaving the recess will open immediately thereto. Inter-communicating passages 186, 187 and 188, formed in the rotor 150, serve to connect the slot 185 to the fluid area 163 in all positions of the rotor.

Preferably, a back pressure valve 189 is interposed between the area 163 and the slot 185 to prevent the trapped pressure energy in the discharge conduits from being dissipated below a predetermined point. The valve 189 utilizes the passage 187 which extends axially of the rotor 150 and which is formed with an annular valve seat 190. A ball 191 is held against the seat 190 yieldably by a coiled compression spring 192 disposed in one end of the passage 187. The adjustable strength of the spring 192 determines the point to which the pressure in the discharge conduits can bleed through the slot 185.

Briefly reviewing the operation, in Fig. 16, the rotor 150 has been adjusted for full throttle, the recess 171 is open to the discharge port 172, and the recess 168 is about to open to the delivery port 159 at which stored pressure energy is available. Assuming continued rotation of the rotor 150 in the direction of the arrow, immediately upon movement of the recess 168 over the port 159, a pressure wave will be released, opening the valve, if any, in the discharge conduit 180, and causing a primary flow. Shortly thereafter, the delivery port 162 is closed by the land area 167 to store up pressure energy in the pump cylinder 154. This occurs at a time when the piston is traveling on its pressure stroke through the zone of maximum speed. Upon movement of the recess 169 over the port 162, a second pressure wave will be released to institute the secondary or main fluid delivery. The secondary flow is superimposed on the primary flow during the remaining portion of the latter. The delivery connection with the conduit 180 is interrupted when the recess 171 leaves the port 172. Immediately thereafter, the conduit 180 is vented to the bleed slot 185 to reduce the trapped pressure therein. The foregoing operation is repeated in timed sequence for the series of discharge ports 172 to 175.

Upon adjusting the rotor 150 axially to reduce the quantity of each discharge, the time of cut-off by the trailing edge 171ᵇ is advanced. For minimum delivery, the recess 171 will leave the port 172 before the recess 169 can establish secondary delivery.

I claim as my invention:

1. A pump comprising, in combination, a plurality of cylinder and piston units, each unit having a separate discharge conduit, the piston of each unit having a stroke of constant length, and means including a rotary valve member operable in timed relation to said units for controlling the extent of each piston displacement on the pressure stroke effective in delivering fluid to the associated discharge conduit, said valve member being axially adjustable to vary the quantity of fluid delivered.

2. A pump comprising, in combination, a plurality of cylinder and piston units operable in uniformly spaced phase relation, each unit having a separate discharge conduit associated therewith, the piston of each unit having a stroke of constant length, and means including a peripheral face rotary valve member driven in timed relation to said units for controlling the delivery in uniformly timed sequence in metered quantities of fluid from the cylinders of said units respectively to said discharge conduits, said valve member being axially adjustable into different operative positions to vary the quantity of fluid delivered during each delivery period.

3. A pump comprising, in combination, a plurality of parallel cylinder and piston units annularly arranged in uniformly spaced relation, each unit having a separate discharge conduit, the piston of each unit having a stroke of constant length, unitary drive means for operating said pump units consecutively in uniformly spaced phase relation, means including a rotary valve member located centrally of said units for controlling the delivery in uniformly timed sequence of fluid in metered quantities from the cylinders of said units respectively to said discharge conduits, and drive means for rotating said member in timed relation to said units, said valve member being axially adjustable to vary the duration of each period of fluid delivery, said two drive means being relatively adjustable to vary the phase relation between said units and said valve member.

4. A pump comprising, in combination, a body defining a cylinder, a piston reciprocable in said cylinder, said piston having a stroke of constant length, said body defining a valve chamber and a port connecting said cylinder to said chamber, a discharge conduit, a rotary valve member in said chamber for effecting the delivery of fluid by displacement from said cylinder to said conduit over a predetermined portion of each pressure stroke of said piston, said valve member being adjustable into different operative positions to vary the extent of said portion and being independently adjustable to vary the phase relation of said portion to the entire stroke, and means for rotating said valve member in timed relation to the reciprocation of said piston.

5. A pump comprising, in combination, a body defining a cylinder, a piston reciprocable in said cylinder, said body defining a valve chamber and a port connecting said cylinder to said chamber, a discharge conduit, a rotary valve member in said chamber for periodically interrupting communication between said chamber and said port to effect the delivery of fluid by displacement from said cylinder to said conduit over a predetermined portion of each pressure stroke of said piston, said valve member being adjustable to vary the extent of said portion, and means for rotating said member in timed relation to the reciprocation of said piston.

6. A pump comprising, in combination, a body defining a cylinder, a piston reciprocable in said cylinder, said body defining a valve chamber and a port connecting the closed end of said cylinder to said chamber, a discharge conduit, means for reciprocating said piston with an harmonic motion, a rotary valve member in said chamber for effecting the periodic delivery of a metered quantity of fluid by piston displacement from said cylinder to said conduit, and means for driving said valve in such timed phase relation to said piston that each period of fluid delivery occurs while said piston is moving at substantially its highest speed during an intermediate portion of its pressure stroke, said last mentioned means being adjustable to vary said phase relation of said period to said stroke.

7. A pump comprising, in combination, a body defining a cylinder, a piston extending reciprocably into said cylinder, said body defining a valve chamber and a port connecting the closed end of said cylinder to said chamber, a discharge line opening from said cylinder, and a rotary valve member in said chamber driven in timed relation to said piston, said valve member being formed with a space defining a low pressure fluid area normally open to said port and with a land area rotatable across said port to interrupt communication thereof with said fluid area only over a predetermined portion of each pressure stroke of said piston to effect the delivery of a metered quantity of fluid by piston displacement from said cylinder to said line.

8. A pump comprising, in combination, a body defining a cylinder, a piston extending reciprocably into said cylinder, said piston having a stroke of constant length, said body defining a cylindrical valve chamber parallel to said cylinder and a port connecting the closed end of said cylinder to said chamber, a discharge line opening from the closed end of said cylinder and including a one-way valve for preventing return flow, and a rotary valve member in said chamber and operable in timed relation to said piston, said valve member being formed in its peripheral surface with a space defining a low pressure fluid area normally open to said port and with a land area rotatable across said port to interrupt communication thereof with said fluid area only over a predetermined portion of each pressure stroke of said piston to effect the delivery of a metered quantity of fluid by piston displacement from said cylinder to said line, said valve member being axially adjustable to vary the extent of said portion.

9. A pump comprising, in combination, a body defining a cylinder, a piston reciprocable in said cylinder, said body defining a valve chamber and a port connecting said cylinder to said chamber, a discharge line, and a rotary valve member in said chamber and operable in timed relation to said piston, said valve member having a space defining a low pressure fluid supply and relief area movable into communication with said port and having a land area rotatable across said port during a portion of each pressure stroke of said piston to interrupt communication between said port and said fluid area to effect the delivery of fluid from said cylinder to said line.

10. A pump comprising, in combination, a body formed with a pump cylinder closed at one end and with a bore constituting an inlet chamber parallel to said cylinder, the closed end of said cylinder having an inlet port opening from said chamber and having a delivery port, a discharge line connected to said delivery port, a spring seated non-return valve interposed between said delivery port and said line, a pump piston slidably disposed in said cylinder, drive means for reciprocating said piston with an harmonic motion, a rotor slidably and rotatably disposed in said chamber, said rotor having an annular low pressure fluid area in its periphery normally in communication with said inlet port and having a raised land area projecting into said fluid area for rotary movement across said inlet port to close said inlet port against communication with said fluid area, a supply inlet opening to said fluid area, means connected to said drive means for rotating said rotor in timed relation to the reciprocation of said piston with said land area movable across said inlet port during an intermediate portion of each pressure stroke of said piston, said land area varying in width longitudinally of said rotor, and means for adjusting said rotor axially.

11. A pump comprising, in combination, a body formed with a pump cylinder closed at one end and with a bore constituting an inlet chamber parallel to said cylinder, the closed end of said cylinder having an inlet port opening from said chamber and having a delivery port, a discharge line connected to said delivery port, a spring seated non-return valve in said line, a pump piston slidably disposed in said cylinder, drive means for reciprocating said piston, a rotor slidably and rotatably disposed in said chamber, said rotor having an annular low pressure fluid area in its periphery normally in communication with said inlet port and having a raised land area projecting into said fluid area for rotary movement across said inlet port to close said inlet port against communication with said fluid area, a supply inlet opening to said fluid area, and means connected to said drive means for rotating said rotor in timed relation to the reciprocation of said piston with said land area movable across said inlet port during each pressure stroke of said piston.

12. A pump comprising, in combination, a body having a plurality of parallel pump cylinders arranged annularly and in uniformly spaced relation, a central valve chamber, and a plurality of inlet ports in a common transverse plane opening respectively from said cylinders to said chamber, a plurality of delivery ports opening respectively from said cylinders, a plurality of discharge lines connected directly to said delivery ports, a plurality of pistons respectively mounted for reciprocation in said cylinders, means for driving said pistons in timed sequence, a valve member rotatably mounted in said chamber and defining a low pressure fluid area therein for communication with said inlet ports, said member having a raised land area interrupting said fluid area for movement successively across said ports, and means for driving said member in timed relation to said pistons to move said land area over each of said inlet ports to close same during a portion only of the pressure period in the associated cylinder.

13. A pump comprising, in combination, a piston and cylinder unit having fluid inlet and discharge means, drive means including a shaft for reciprocating the piston, a rotary valve member for controlling said first mentioned means, said shaft and said member being axially alined and being formed in their adjacent ends respectively with two opposed axial bores, said member being formed with two diametrically opposed longitudinal slots opening to opposite sides of its bore, said shaft being formed with an inclined slot opening to one side of its bore, an intermediate shaft extending slidably at its opposite ends respectively into said bores and having keys extending slidably into said slots, and rack and gear means for adjusting said intermediate shaft axially whereby the drive phase relation between said piston and said valve member may be adjusted.

14. A pump comprising, in combination, a piston and cylinder unit having fluid inlet and discharge means, means including a drive shaft for reciprocating the piston, a rotary valve member for controlling said first mentioned means, said shaft and said member being axially alined, an intermediate shaft telescoping at its opposite ends respectively with said member and said drive shaft, said intermediate shaft having an axial spline connection with said valve member and an inclined slot and pin connection with said drive shaft, and means for adjusting said intermediate shaft axially whereby the drive phase relation between said piston and said member may be adjusted.

15. A pump comprising, in combination, a piston and cylinder unit having fluid inlet and discharge means, drive means including a shaft for reciprocating the piston, a rotary valve member axially aligned with said shaft for controlling said first mentioned means, and means connecting said shaft to said member for rotating the latter in timed relation to the reciprocation of said piston, said last mentioned means being adjustable to vary the drive phase relation between said piston and said valve member.

16. A pump comprising, in combination, a body section having a bore opening therethrough and having a plurality of parallel pump cylinders spaced uniformly about said bore, a plurality of pistons one reciprocable in each cylinder, means for driving said pistons in timed sequence, fluid inlet and discharge means for said cylinders, a cylindrical valve member for controlling said last mentioned means, said valve member extending slidably and rotatably through said bore, means operatively connected to one end of said member for adjusting said member axially, and means axially splined to the other end of said member for rotating said member in timed relation to the reciprocation of said piston.

17. A pump comprising, in combination, a body formed with a pump cylinder, a delivery port opening from said cylinder, and a discharge port spaced from said delivery port and said cylinder, a piston reciprocable in said cylinder, and a rotary valve driven in timed relation to said piston for connecting said delivery port to said discharge port during a predetermined portion of each pressure stroke of said piston, said valve being adjustable to vary the extent of said portion.

18. A pump comprising, in combination, a body formed with a pump cylinder, a delivery port opening from said cylinder, and a discharge port spaced from said delivery port, a piston reciprocable in said cylinder, means for driving said piston with an harmonic motion, and a rotary valve driven in timed relation to said piston for connecting said delivery port to said discharge port during an intermediate portion of each pressure stroke of said piston, said valve being adjustable to vary the phase relation of said portion to said entire stroke.

19. A pump comprising, in combination, a body formed with a pump cylinder, a fluid supply, a delivery and inlet port opening from said cylinder, and a discharge port spaced from said delivery port and said cylinder, a piston reciprocable in said cylinder, and a rotary metering valve member driven in timed relation to said piston, said member having two spaced interconnected recesses movable respectively and in partially overlapping relation into communication with said ports once during a part only of each pressure stroke of said piston, said valve member having a third recess for connecting said first mentioned port to said fluid supply during the remaining part of each pressure stroke and during each suction stroke.

20. A pump comprising, in combination, a body formed with a pump cylinder, a delivery port opening from said cylinder, and a discharge port spaced from said delivery port, a piston reciprocable in said cylinder, and a rotary valve member driven in timed relation to said piston, said member having two spaced interconnected recesses movable successively into overlapping periods of communication respectively with said ports during each pressure stroke of said pistons, whereby initially stored pressure energy is created in said cylinder and then the delivery of a metered quantity of fluid initiated with a pressure wave is effected.

21. A pump comprising, in combination, a body formed with a pump cylinder, a delivery port opening from said cylinder, and a discharge port spaced from said delivery port, a piston reciprocable in said cylinder, and a rotary valve member driven in timed relation to said piston, said member having two spaced recesses movable respectively and for overlapping periods into communication with said ports once during each pressure stroke of said piston, and having a passage connecting said recesses, and a non-return valve interposed in said passage between said recesses.

22. A pump comprising, in combination, a body formed with a pump cylinder, a delivery port opening from said cylinder, and a discharge port spaced from said delivery port, a piston reciprocable in said cylinder, and a cylindrical rotary valve member driven in timed relation to said piston, said member having two elongated generally longitudinal interconnected recesses movable respectively across said ports for simultaneous communication therewith over a predetermined portion of each pressure stroke of said piston, said recesses having controlling edges relatively inclined longitudinally of said member for adjusting the extent of said portion upon axial adjustment of said rotor.

23. A pump comprising, in combination, a body formed with a pump cylinder and a delivery port opening from said cylinder, a piston reciprocable in said cylinder, and a rotary valve member driven in timed relation to said piston, said valve member defining a low pressure fluid area normally open to said delivery port, and a raised land area projecting into the zone of said fluid area for movement across said delivery port to interrupt communication thereof with said fluid area over a predetermined portion of each pressure stroke of said piston, and a recess formed in said land area for movement across said delivery port to receive a metered quantity of fluid therefrom.

24. A pump comprising, in combination, a body formed with a pump cylinder and a delivery port opening from said cylinder, a piston reciprocable in said cylinder, and a cylindrical axially adjustable rotary valve member driven in timed relation to said piston, said valve member defining a low pressure peripheral fluid area normally open to said delivery port, and a raised land area projecting into the zone of said fluid area for movement across said delivery port to interrupt communication thereof with said fluid area over a portion of each pressure stroke of said piston, an elongated recess formed in said land area for movement across said delivery port to receive a metered quantity of fluid therefrom, said recess having a side edge inclined to the axis of said member, and means for adjusting said member axially.

25. A pump comprising, in combination, a body formed with a pump cylinder and a delivery port opening from said cylinder, a piston reciprocable in said cylinder, and a cylindrical axially adjustable rotary valve member driven in timed relation to said piston, said valve member defining a low pressure peripheral fluid area normally open to said delivery port, and a raised land area projecting into the zone of said fluid area for movement across said delivery port to interrupt communication thereof with said fluid area over a portion of each pressure stroke of said piston, an elongated recess formed in said land area for movement across said delivery port to receive a quantity of fluid therefrom, a discharge port in said body, a second elongated recess connected to said first mentioned recess and formed in the periphery of said valve member for movement across said discharge port, said second recess having a leading edge parallel to the axis of rotation and movable over said discharge port to institute the period of fluid delivery after said first mentioned recess has established communication with said delivery port, said first mentioned recess having a trailing edge inclined to said axis and movable from said delivery port to terminate said period before said second recess has left said discharge port, and means for adjusting said valve member axially to vary the duration of said period.

26. A pump comprising, in combination, a body formed with a pump cylinder, a delivery port opening from said cylinder, and a discharge port, a piston reciprocable in said cylinder, and a rotary valve member driven in timed relation to said piston, said valve member defining a low pressure fluid area normally open to said delivery port, and a raised land area projecting into the zone of said fluid area for movement across said delivery port to interrupt communication thereof with said fluid area over a predetermined portion of each pressure stroke of said piston, an elongated recess formed in said valve member for movement across said discharge port, a second elongated recess formed in said land area for movement across said delivery port to receive a metered quantity of fuel therefrom, said second recess having a leading edge parallel to the axis of said rotor and defining a leading face on said land, said leading face being greater in width than said delivery port to seal said cylinder, said leading edge being movable onto said delivery port to institute the period of fluid delivery after communication of said first mentioned recess with said discharge port is established, said first mentioned recess having a trailing edge inclined to said axis and movable from said discharge port to terminate said period while said second recess is open to said delivery port, and means for adjusting said valve member axially.

27. A pump comprising, in combination, a body formed with a pump cylinder, a delivery port opening from said cylinder, and a discharge port spaced from said delivery port, a piston reciprocable in said cylinder, and a cylindrical axially adjustable rotary valve member driven in timed relation to said piston, said valve member defining a low pressure peripheral fluid area normally open to said delivery port, and a raised land area projecting into the zone of said fluid area for movement across said delivery port to interrupt communication thereof with said fluid area over a predetermined portion of each pressure stroke of said piston, an elongated recess formed in said land area for movement across said delivery port to receive a metered quantity of fuel therefrom, said valve member being formed in its periphery with a recess connected to said first mentioned recess and movable across said discharge port, said recesses being spaced to communicate simultaneously for a predetermined portion of said pressure stroke respectively with said ports, one of said recesses having a leading edge parallel to the axis of rotation for initiating said communication and the other of said recesses having a trailing edge inclined to said axis for ending said communication, and means for adjusting said valve member axially.

28. A pump comprising, in combination, a body formed with a pump cylinder, a delivery port opening from said cylinder, and a discharge port spaced from said delivery port, a piston reciprocable in said cylinder, and a cylindrical axially adjustable rotary valve member driven in timed relation to said piston, said valve member defining a low pressure peripheral fluid area normally open to said delivery port, and a raised land area projecting into the zone of said fluid area for movement across said delivery port to interrupt communication thereof with said fluid area over a predetermined portion of each pressure stroke of said piston, an elongated recess formed in said land area for movement across said delivery port to receive a metered quantity of fuel therefrom, said valve member being formed in its periphery with a recess connected to said first mentioned recess and movable across said discharge port, said recesses being spaced to communicate simultaneously for a predetermined portion of said pressure stroke respectively with said ports, one of said recesses having a leading edge parallel to the axis of rotation for initiating said communication and the other of said recesses having a trailing edge inclined to said axis for ending said communication, said valve member being formed with a recess trailing said second mentioned recess by a distance substantially equal to the width of said discharge port and with a passage connecting said last mentioned recess to said fluid area, a back pressure valve interposed in said passage, and means for adjusting said valve member axially to vary the extent of said last mentioned portion.

29. A pump comprising, in combination, a body formed with a pump cylinder, a delivery port opening from said cylinder, and a discharge port spaced from said delivery port and said cylinder, a piston reciprocable in said cylinder, and a rotary metering valve member driven in timed relation to said piston, said valve member having a flow passage movable into position to connect said ports once during only an intermediate predetermined part of each pressure stroke of said piston.

30. A pump comprising, in combination, a body formed with a pump cylinder, a delivery port opening from said cylinder, and a discharge port spaced from said delivery port, a piston reciprocable in said cylinder, a rotary valve member driven in timed relation to said piston, said member having a flow passage movable into position to connect said ports for a predetermined portion of the pressure stroke of said piston once during each pressure stroke, and means for venting said discharge port to a lower pressure immediately after said period.

31. A pump comprising, in combination, a body formed with a pump cylinder, a delivery port opening from said cylinder, and a discharge port spaced from said delivery port, a piston reciprocable in said cylinder, a cylindrical valve member rotatable in timed relation to the movement of said piston, said member having a low pressure fluid area, a passage for connecting said ports for a predetermined portion of the pressure stroke of said piston once during each pressure stroke, a recess movable into communication with said discharge port immediately after said portion, and a passage connecting said recess to said area, and a back pressure valve in said last mentioned passage, said delivery port being adapted for communication with said area during substantially the entire time that the delivery port is not open to said first mentioned passage.

32. A pump comprising, in combination, a plurality of pump cylinders, a plurality of pistons one reciprocable in each cylinder, means for driving said pistons in timed sequence, a plurality of sets of ports one set for each cylinder and comprising a delivery port opening from said cylinder and a discharge port spaced from said cylinder, and a rotary metering valve driven in timed phase relation to said pistons and having a flow passage movable successively into coacting relation with said sets of ports and in each instance connecting the ports of one set for the delivery of a metered quantity of fluid during a part only of the pressure stroke of the related piston.

33. A pump comprising, in combination, a plurality of parallel annularly arranged pump cylinders, a plurality of pistons one reciprocable in each cylinder, means for driving said pistons in timed sequence, a central valve chamber, a plurality of delivery ports opening in a common transverse plane respectively from said cylinders to said chamber, a plurality of discharge ports opening directly from said chamber and paired respectively with said delivery ports, a rotary metering valve member in said chamber, and means for driving said member in timed relation to said pistons, said member having a flow passage movable to connect the ports of each of said pairs once during one part only of each pressure stroke of the related piston, and having a relief area movable into communication with each delivery port during substantially the remaining part of each pressure stroke.

34. A pump comprising, in combination, a plurality of parallel angularly arranged pump cylinders, a plurality of pistons one reciprocable in each cylinder, means for driving said pistons in timed sequence, a central cylindrical valve chamber, a plurality of delivery ports opening in a common transverse plane respectively from said cylinders to said chamber, a plurality of discharge ports opening from said chamber and paired respectively with said delivery ports, a cylindrical rotary valve member in said chamber, and means for driving said member in timed relation to said pistons, said member having a flow passage movable to connect the ports of each of said pairs once during each pressure stroke of the related piston, said passage terminating at its ends in two spaced elongated recesses in the periphery of said member, said recesses having controlling edges relatively inclined to each other longitudinally of said member, and means for adjusting said member axially to vary the relative phase relations of said controlling edges respectively to said ports.

35. A pump comprising, in combination, a body formed with a plurality of parallel annularly arranged cylinders, a central valve chamber, a plurality of delivery ports opening respectively from said cylinders in a common transverse plane to said chamber, and a plurality of discharge ports one for each cylinder opening in another common transverse plane from said chamber, a plurality of pistons respectively reciprocable in said cylinders, means for driving said pistons in timed sequence, a rotary valve member mounted in said chamber, means for rotating said valve member in timed relation to the reciprocation of said pistons, said valve member having a peripheral space defining an annular low pressure fluid area extending through said first mentioned plane for communication with said delivery ports, two raised land areas on said member projecting in spaced relation into said fluid area through the zone of said delivery ports, two recesses formed respectively in said land areas, said recesses being spaced apart to move successively into respective communication with two delivery ports of any one of a plurality of sets of said delivery ports, and a third recess formed in said valve member for movement successively across said discharge ports and in intercommunication with said first mentioned recesses, said third recess being related in phase to said first mentioned recesses to communicate with each discharge port during communication of said first mentioned recesses singly or jointly with the two related delivery ports.

36. A pump comprising, in combination, a body formed with a plurality of parallel annularly arranged cylinders, an axial valve bore, a plurality of delivery ports opening respectively from said cylinders in a common transverse plane to said bore, and a plurality of discharge ports one for each cylinder opening in another common transverse plane from said bore, a plurality of pistons respectively reciprocable in said cylinders, means for driving said pistons in timed sequence, a cylindrical valve member rotatably and slidably mounted in said bore, means for rotating said valve member in timed relation to the reciprocation of said pistons, said valve member having a peripheral space defining an annular low pressure fluid area extending through said first mentioned plane for communication with said delivery ports, two raised land areas on said member projecting in spaced relation into said fluid area through the zone of said delivery ports, two recesses formed respectively in said land areas, said recesses being spaced apart slightly more than the distance between any two adjacent delivery ports, each recess having a leading edge parallel to the axis of rotation, a third recess formed in said valve member for movement successively across said discharge ports and in intercommunication with said first mentioned recesses, said third recess being related in phase to said first mentioned recesses to communicate with each discharge port during communication of said first mentioned recesses singly or jointly with two related delivery ports, said last mentioned recess having a trailing edge inclined to said axis, and means for adjusting said rotor axially.

37. A pump comprising, in combination, a body formed with a plurality of parallel annularly arranged cylinders, a central valve chamber, a plurality of delivery ports opening respectively from said cylinders to said chamber, and a plurality of discharge ports one for each cylinder opening from said chamber, a plurality of pistons respectively reciprocable in said cylinders, means for driving said pistons in timed sequence, a rotary valve member mounted in said chamber, and means for driving said valve member in timed relation to the reciprocation of said pistons, said valve member having means for periodically connecting each discharge port over predetermined portions of the pressure delivery strokes of the respective pistons in overlapping sequence to a plurality of said delivery ports for the supply of a metered quantity of fluid at a graduated rate of flow.

38. A pump comprising, in combination, a plurality of pump cylinders, each cylinder having a delivery port, a plurality of pistons respectively reciprocable in said cylinders, means for driving said pistons in uniformly timed sequence, a plurality of discharge lines one for each cylinder, and means operable in timed relation to said pistons for delivering metered quantities of fluid under pressure from said cylinders in uniformly timed sequence to said discharge lines, said means being operable to connect a plurality of said ports to each of said lines during each period of fluid delivery.

39. A pump comprising, in combination, a plurality of pump units, each unit comprising a cylinder having a delivery port, and a piston reciprocable in said cylinder, means for driving the pistons, a discharge passage, and means for connecting said ports in progressively increasing number during the pressure strokes of said pistons to said passage to deliver a metered quantity of fluid at a graduated rate to said passage once during each pump cycle.

40. A pump comprising, in combination, a plurality of pump cylinders, each cylinder having a delivery port, a plurality of pistons respectively reciprocable in said cylinders, means for driving said pistons, a discharge line, and means including a rotary valve member operable in timed relation to said pistons for periodically connecting said ports simultaneously to said discharge line during the pressure strokes of said pistons to periodically deliver a metered quantity of fluid to said discharge line.

41. A pump comprising, in combination, a plurality of pump cylinders, each cylinder having a delivery port, a plurality of pistons respectively reciprocable in said cylinders, means for driving said pistons in timed sequence, a discharge line, and means including a rotary valve member operable in timed relation to said pistons for periodically connecting said ports progressively in succession and at different points in the respective pressure strokes of the related pistons to said line to deliver at a progressively increasing rate a metered quantity of fluid thereto, said member being adjustable to vary the amount of said metered quantity of fluid.

42. A metering and distributing pump comprising, in combination, a body having a plurality of parallel pump cylinders arranged annularly and in uniformly spaced relation, a central valve chamber about which said cylinders are spaced, a plurality of delivery ports opening respectively from the pressure ends of said cylinders, a plurality of inlet ports opening from the periphery of said chamber respectively to said ends of said cylinders, a plurality of pistons respectively mounted in said cylinders, means for driving said pistons in timed sequence, a valve member rotatably mounted in said chamber for controlling said inlet ports, means for driving said valve member in timed relation to said pistons, said valve member having a land area movable successively across said inlet ports to close each inlet port during a predetermined portion of the pressure stroke of the associated piston to cause fluid to be delivered to the associated delivery port, and having a fluid supply area movable into communication with successive inlet ports and establishing intercommunication between all of said inlet ports not closed by said land area.

43. A metering and distributing pump comprising, in combination, a body having a bore and a plurality of parallel pump cylinders arranged annularly and in uniformly spaced relation about said bore, a plurality of ports opening from the periphery of said bore respectively to the discharge ends of said cylinders, a plurality of separate discharge lines one for each cylinder, a plurality of pistons respectively reciprocable in said cylinders, means for driving said pistons with an harmonic motion in uniformly timed sequence, a rotary valve member operatively mounted in said bore, said valve member being formed with a low pressure peripheral fluid area normally open to said inlet ports and establishing intercommunication therebetween and with a land area projecting into said fluid area for movement successively and individually across said ports to interrupt communication thereof with said fluid area over a predetermined portion of each pressure stroke of the associated piston and to effect the delivery in uniformly timed sequence of metered quantities of fluid from said cylinders respectively to said lines, means for driving said valve member in timed relation to the reciprocation of said pistons, said land area varying in width along said valve member, means for adjusting said valve member axially, and means for adjusting the timed phase relation between said pistons and said valve member.

44. A metering and distributing pump comprising, in combination, a body having a bore and a plurality of parallel pump cylinders arranged annularly and in uniformly spaced relation about said bore, a plurality of ports opening from the periphery of said bore respectively to the discharge ends of said cylinders, a plurality of separate discharge lines one for each cylinder, a plurality of pistons respectively reciprocable in said cylinders, means including a shaft for driving said pistons with an harmonic motion in uniformly timed sequence, a rotary valve member operatively mounted in said bore in axial alignment with said shaft, said valve member being formed with a low pressure peripheral fluid area normally open to said inlet ports and establishing intercommunication therebetween and with a land area projecting into said fluid area for movement successively and individually across said ports to interrupt communication thereof with said fluid area over a predetermined portion of each pressure stroke of the associated piston and to effect the delivery in uniformly timed sequence of metered quantities of fluid from said cylinders respectively to said lines, said land area varying in width along said valve member, means including an axially adjustable spline connection between said shaft and said valve member for driving said valve member in timed relation to the reciprocation of said pistons, and means for adjusting said valve member axially.

45. A pump comprising, in combination, a plurality of pump units each having a cylinder with an inlet port and with an individual discharge line and a piston reciprocable in said cylinder, means for reciprocating the pistons in timed sequence, a low pressure fluid source normally in direct communication with the inlet ports, and means operable in timed relation to said first mentioned means and including a single valve member common to all of the cylinders for closing each inlet port during a predetermined portion of the pressure stroke of the associated piston.

46. A metering and distributing pump comprising, in combination, a body having a valve chamber and a plurality of parallel pump cylinders annularly arranged about said chamber, a plurality of ports opening from the periphery of said chamber respectively to the discharge ends of said cylinders, a plurality of separate discharge lines respectively connected directly to said cylinders, a plurality of pistons respectively reciprocable in said cylinders, means for driving said pistons in uniformly timed sequence, a rotary valve member operatively mounted in said chamber and having a land area movable successively across said ports and timed to seal each port during a predetermined portion of the pressure stroke of the associated piston to effect the discharge of fluid to the associated line, and having a low pressure peripheral area for venting and establishing intercommunication between the cylinders of which said ports are not closed by said land area.

47. A pump comprising, in combination, a plurality of pumping units each having a cylinder and piston reciprocable therein, means for driving said pistons in timed sequence, a plurality of separate discharge lines one for each cylinder, each cylinder having two ports of which one is a pressure discharge port opening to the associated discharge line and the other is a suction and pressure relief port for admitting fluid during each suction stroke of the associated piston, a low pressure fluid supply chamber normally in communication with the suction and relief ports of said units, a rotary valve member in said chamber for controlling said suction and relief ports, and means for operating said valve member in timed relation to said pistons, said valve member having a land area movable successively over said suction and relief ports to close each during a predetermined portion of the pressure stroke of the associated piston, and being recessed to relieve each of said suction and relief ports to said chamber at all other times.

48. A pump comprising, in combination, a plurality of pump units each having a cylinder and a piston reciprocable therein, means for driving said pistons in timed sequence, each of said cylinders having one port for admitting and discharging fluid respectively during the suction and pressure strokes of the associated piston, a low pressure fluid supply chamber, a rotary valve member in said chamber for controlling said ports, and means for operating said valve member in timed relation to said pistons, said valve member being recessed to define with said chamber a low pressure fluid area normally open to each of said ports, a raised land area projecting into the zone of said fluid area for movement successively across said ports to interrupt communication of each of said ports with said fluid area during a portion of the pressure stroke of the associated piston, each port at all other times relieving to said fluid area, and a discharge passage having an inlet port in the face of said land area for movement successively into communication with said first mentioned ports when covered by said land area to receive the fluid displaced by each piston during said portion of the pressure stroke.

49. A pump comprising, in combination, a plurality of pump units each having a cylinder and a piston reciprocable therein, means for driving said pistons in timed sequence, each of said cylinders having a delivery port, a plurality of discharge passages respectively for said units and spaced from the associated cylinders and the delivery ports, and a rotary metering valve member driven in timed relation to said pistons and having a flow passage movable to connect said ports successively to their respective discharge passages, the connection in each instance being established only during an intermediate predetermined part of each pressure stroke of the associated piston.

CARROLL R. ALDEN.

CERTIFICATE OF CORRECTION.

Patent No. 2,052,549.

September 1, 1936.

CARROLL R. ALDEN.

It is hereby certified that error appears in the printed specification of the above numbered patent requiring correction as follows: Page 7, second column, line 50, claim 9, for the word "movable" read rotatable; and line 51, same claim, for "rotatable" read movable; page 10, second column, line 50, claim 34, for "angularly" read annularly; page 11, second column, line 50-51, claim 41, strike out "in succession"; and that the said Letters Patent should be read with these corrections therein that the same may conform to the record of the case in the Patent Office.

Signed and sealed this 17th day of November, A. D. 1936.

(Seal)

Henry Van Arsdale

Acting Commissioner of Patents.

said pistons in timed sequence, each of said cylinders having a delivery port, a plurality of discharge passages respectively for said units and spaced from the associated cylinders and the delivery ports, and a rotary metering valve member driven in timed relation to said pistons and having a flow passage movable to connect said ports successively to their respective discharge passages, the connection in each instance being established only during an intermediate predetermined part of each pressure stroke of the associated piston.

CARROLL R. ALDEN.

CERTIFICATE OF CORRECTION.

Patent No. 2,052,549.

September 1, 1936.

CARROLL R. ALDEN.

It is hereby certified that error appears in the printed specification of the above numbered patent requiring correction as follows: Page 7, second column, line 50, claim 9, for the word "movable" read rotatable; and line 51, same claim, for "rotatable" read movable; page 10, second column, line 50, claim 34, for "angularly" read annularly; page 11, second column, line 50-51, claim 41, strike out "in succession"; and that the said Letters Patent should be read with these corrections therein that the same may conform to the record of the case in the Patent Office.

Signed and sealed this 17th day of November, A. D. 1936.

(Seal)

Henry Van Arsdale
Acting Commissioner of Patents.

CERTIFICATE OF CORRECTION.

Patent No. 2,052,549.　　　　　　　　　　　　　　　　　September 1, 1936.

CARROLL R. ALDEN.

It is hereby certified that error appears in the printed specification of the above numbered patent requiring correction as follows: Page 7, second column, line 50, claim 9, for the word "movable" read rotatable; and line 51, same claim, for "rotatable" read movable; page 10, second column, line 50, claim 34, for "angularly" read annularly; page 11, second column, line 50-51, claim 41, strike out "in succession"; and that the said Letters Patent should be read with these corrections therein that the same may conform to the record of the case in the Patent Office.

Signed and sealed this 17th day of November, A. D. 1936.

(Seal)

Henry Van Arsdale

Acting Commissioner of Patents.